UNITED STATES PATENT OFFICE.

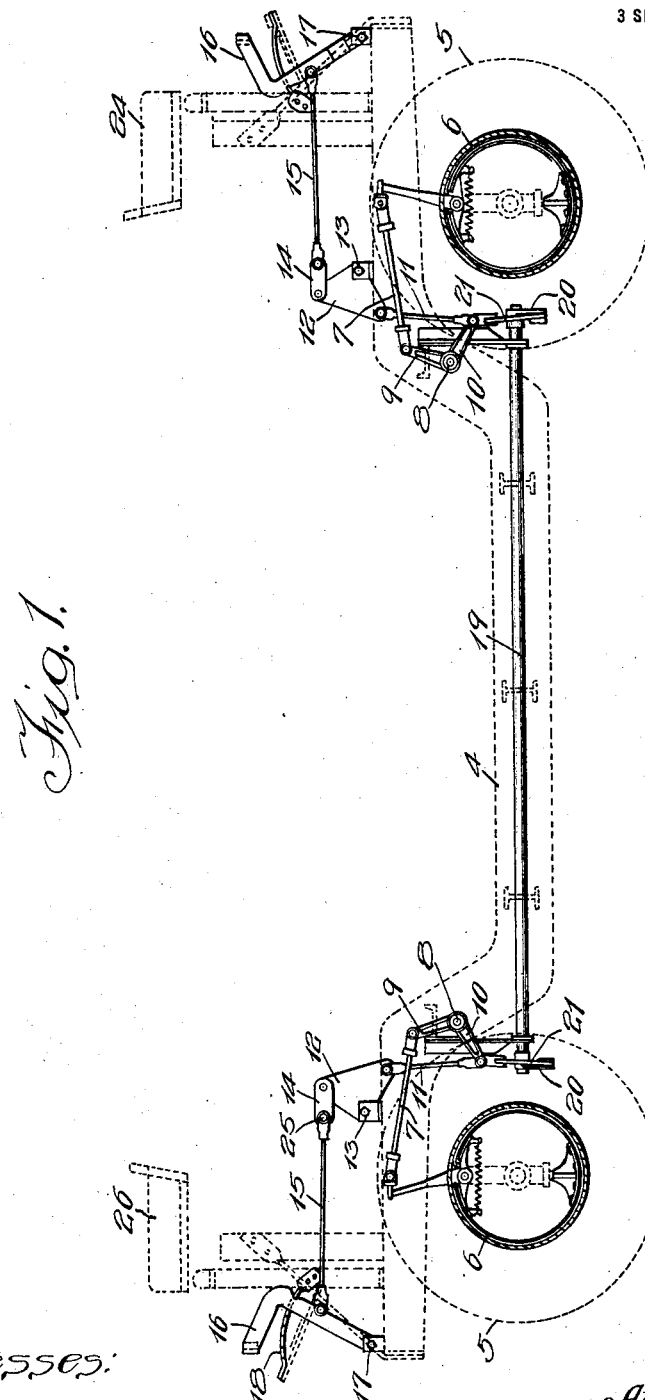

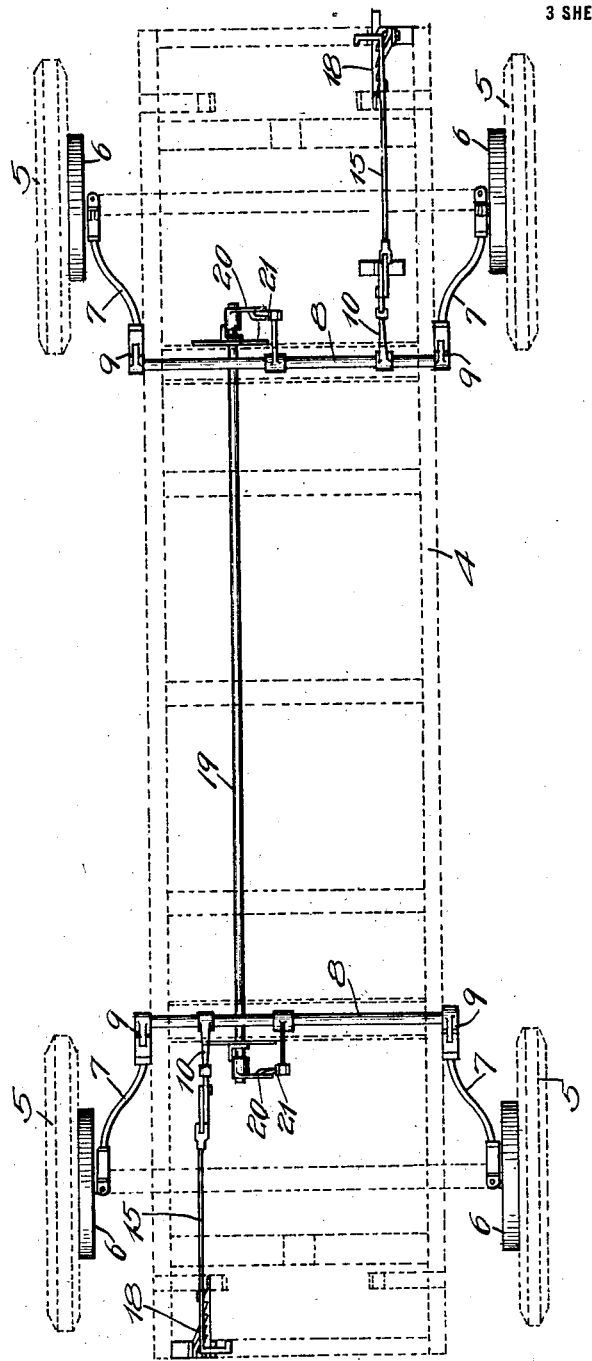

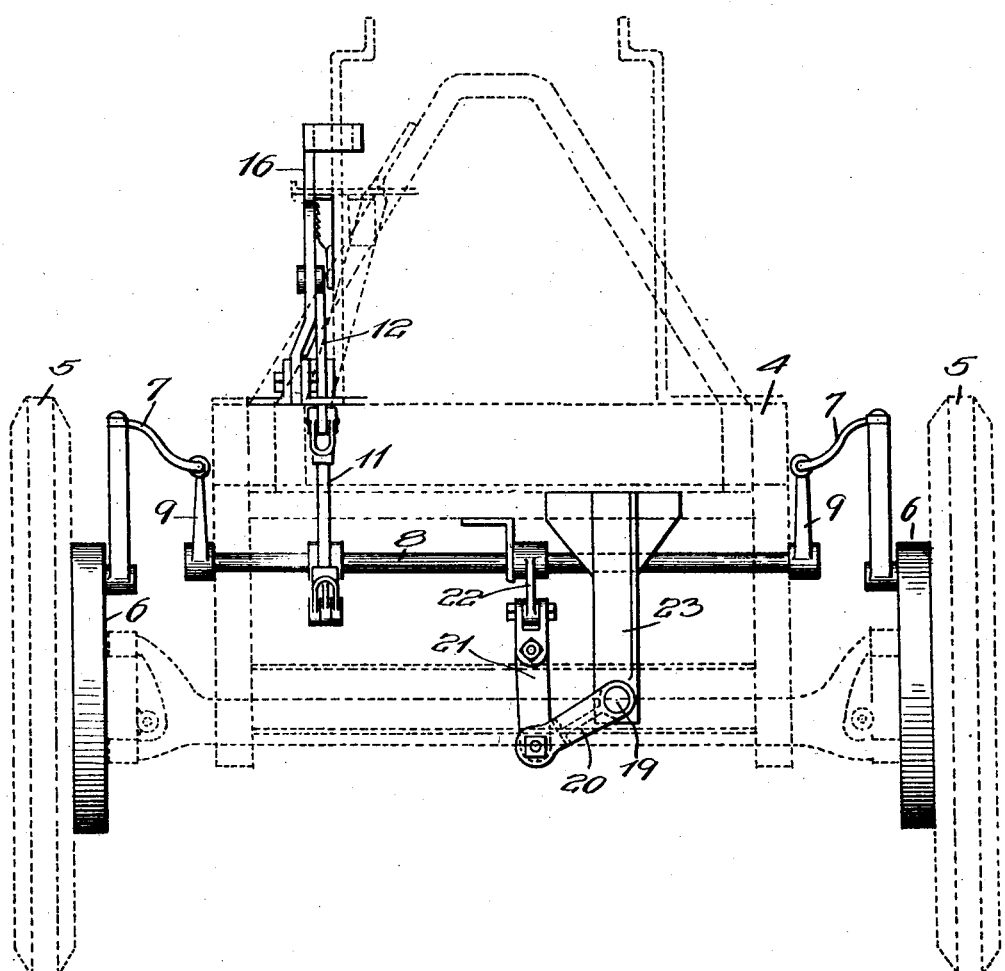

ALBERT P. LEE, OF CHICAGO, ILLINOIS, ASSIGNOR TO LEE TRAILER & BODY COMPANY, OF CHICAGO, ILLINOIS.

BRAKE-OPERATING MECHANISM.

1,384,073.  Specification of Letters Patent.  Patented July 12, 1921.

Application filed September 7, 1920. Serial No. 408,459.

*To all whom it may concern:*

Be it known that I, ALBERT P. LEE, a citizen of the United States, residing at Chicago, in the county of Cook and State of Illinois, have invented a certain new and useful Improvement in Brake - Operating Mechanism, of which the following is a full, clear, concise, and exact description, reference being had to the accompanying drawings, forming a part of this specification.

This invention relates to brakes and more particularly to a vehicle brake operating mechanism.

It is a purpose of the invention to provide a vehicle brake that can be operated from either end of the vehicle, the invention being particularly adapted to be applied to automobile trailers that can also be used as horse drawn vehicles.

It is a further purpose of the invention to provide a brake operating mechanism that can be actuated from either end of a vehicle, the operating levers being so mounted that the operation of the brake from one end of the vehicle will not affect the operating lever at the other end thereof. This result is obtained by providing lost motion connections between the operating levers and the remainder of the brake operating mechanism.

Other objects and advantages of the invention will appear as the description of the accompanying drawings showing one form that my invention may take proceeds. However, I desire to have it distinctly understood that I do not intend to limit myself to the exact details shown and described in the specification, but intend to include all such obvious changes in structure and modifications of parts as would occur to a person skilled in this art and falling within the scope of the claims.

In the drawings,

Figure 1 is a side elevation of the brake operating mechanism showing the vehicle framework to which it is applied in dotted lines;

Fig. 2 is a plan view of the same, showing the vehicle framework in dotted lines; and Fig. 3 is an enlarged end elevation of the same, showing the vehicle framework in dotted lines.

Referring in detail to the drawings the invention is shown as being applied to a vehicle framework 4 which in the present case is shown as being a drop framework, and is provided with the wheels 5. In Fig. 1 each of the wheels is shown as being provided with a brake 6 which is shown as being an expansion brake of a well known form. The brakes 6 are operated by the rods 7, a movement of the rods 7 toward the middle of the vehicle tightening the brakes, and a movement toward the ends of the vehicle releasing the brakes.

In the device shown in Fig. 1 all of the wheels are provided with brakes. However, only one set of wheels may be provided with brakes if it is desired, and the operation of the device would be the same. In order to make it possible to operate the brakes from both ends of the vehicle, suitable brake operating mechanism must be provided and in the present invention this brake operating mechanism comprises transverse shafts 8 mounted on opposite ends of the vehicle framework in any suitable manner, each of the shafts 8 being provided with a pair of arms 9 operatively connected with the rod 7 and keyed to the shaft 8 to turn therewith. Each of the shafts 8 is also provided with an arm 10 keyed thereto to turn therewith. Pivotally connected to each of the arms 10 is a rod 11 which is pivoted to a triangular link 12 at one corner thereof. The triangular link 12 is pivoted to the vehicle framework at 13 at a second corner thereof, and the third corner of the triangular link 12 is pivoted to a short link 14, which is pivotally connected to a rod 15 pivoted to the foot lever 16 intermediate the ends thereof, the foot lever 16 being pivoted to the framework at 17. The foot lever 16 is provided with a suitable rack 18 provided with ratchet teeth for holding the lever in any desired position.

In order to operate all of the brakes simultaneously a longitudinally extending shaft 19 is provided which has keyed thereto at the opposite ends thereof the arms 20 which are pivoted to the links 21, which are pivoted in turn to the arms 22 keyed to the transverse shafts 8, the shaft 19 being mounted in suitable bearings provided in brackets 23 on the vehicle framework. It will be noted that the arms 10 and 9 on the shaft 8 extend in opposite directions at opposite ends of the framework and that the arms 22 also extend in opposite directions at opposite ends of the vehicle framework. The operation of the device is as follows:

Assuming that the driver is located at the driver's seat 24 at the right hand end of the vehicle in Fig. 1 he can apply the brakes by pushing down on the foot lever 16. This will tilt the link 12 to pull the rod 11 upwardly, thus pulling up on the arm 10 and turning the shaft 8 in its bearings and turning the arms 9 counter clockwise to draw the rod 7 toward the center of the vehicle to apply the brakes at the right hand end of the vehicle. At the same time the arm 22 on the shaft 8 at the right hand end of the vehicle is turned in a counter clockwise direction, thus raising the link 21 and turning the shaft 19 so as to raise the opposite link 21 in the left hand end of the vehicle, thus moving the arm 22 at that end of the vehicle in a clockwise direction carrying with it the shaft 8 and the arms 9 and 10. The arm 9 will pull the rod 7 toward the right and apply the brakes at the left hand end of the vehicle. As the arm 10 is swung in a clockwise direction the rod 11 will be raised swinging the triangular link 12 counter clockwise. When this is done the pivot point at 25 will drop and the link 14 and the rod 15 will be thrown out of alinement, thus allowing for the movement of the parts without disturbing the position of the foot lever 16 at the left hand end of the vehicle. In a similar manner the brakes can be operated from the driver's seat 26 at the left hand end of the vehicle without disturbing the operating lever 16 and rod 15 at the right hand end.

Having thus described my invention what I claim as new and desire to secure by U. S. Letters Patent is:

1. A device of the character described comprising brakes, a plurality of brake operating levers, brake operating mechanism operated by said levers, and a lost motion connection between said brake operating mechanism and each of said levers whereby said brakes may be operated from either of said levers.

2. A device of the character described comprising brakes, a plurality of brake operating levers, brake operating mechanism operated by said levers, and a lost motion connection between said brake operating mechanism and each of said levers whereby said brakes may be operated from either of said levers, said lost motion connection comprising a plurality of pivotally connected rigid links.

3. A device of the character described comprising brakes, operating mechanism for each of said brakes, levers for actuating said operating mechanism, means connecting said operating mechanisms for operating all of said brakes in unison, and a lost motion connection between each of said levers and said brake operating mechanism whereby said brakes may be operated from either of said levers.

4. A device of the character described comprising brakes, brake operating mechanism for operating said brakes in pairs, comprising pairs of arms keyed to a common shaft, an operating lever for each pair of brakes, and a lost motion connection between said operating lever and one of said arms on said shaft.

5. A brake mechanism for vehicles comprising brakes at opposite sides of the vehicle framework, brake operating levers at opposite ends of said framework, and means whereby said brakes can be operated in unison from either end of said framework, said means comprising transverse shafts, brake actuating arms adapted to operate said brakes on turning of said shafts, means connecting said shafts to simultaneously turn in opposite directions and a lost motion connection between each of said shafts and said brake operating levers.

6. A brake mechanism for vehicles, comprising brakes at opposite sides of the vehicle framework, brake operating levers at opposite ends of said framework, and means whereby said brakes can be operated in unison from either end of said framework, said means comprising transverse shafts, brake actuating arms adapted to operate said brakes on turning of said shafts, a longitudinally extending shaft connecting said transverse shafts to simultaneously turn in opposite directions and a lost motion connection between each of said transverse shafts and said brake operating levers.

7. A brake mechanism for vehicles, comprising brakes at opposite sides of the vehicle framework, brake operating levers at opposite ends of said framework, and means whereby said brakes can be operated in unison from either end of said framework, said means comprising transverse shafts, brake actuating arms adapted to operate said brakes on turning of said shafts, a longitudinally extending shaft, links connecting said longitudinally extending shaft with said trasverse shafts to simultaneously turn said transverse shafts in opposite directions and a lost motion connection between each of said shafts and said brake operating levers.

8. A brake mechanism of the character described, comprising brakes at opposite sides of a vehicle, links connecting said brakes with arms mounted to turn with a shaft extending transversely of said vehicle, an arm extending at an angle to said first mentioned arms mounted to turn with said shaft and means for actuating said last mentioned arm from either end of said vehicle.

9. A brake mechanism of the character described, comprising brakes at opposite sides of a vehicle, links connecting said brakes with arms mounted to turn with a shaft extending transversely of said vehicle, an arm extending at an angle to said first mentioned arms mounted to turn with said shaft, and means for actuating said last mentioned arm from either end of said vehicle, said means comprising an operating lever at each end of said vehicle and a lost motion connection between said arm and each of said operating levers.

10. A brake mechanism of the character described, comprising brakes at opposite sides of a vehicle, links connecting said brakes with arms mounted to turn with a shaft extending transversely of said vehicle, an arm extending at an angle to said first mentioned arms mounted to turn with said shaft, and means for operating said last mentioned arm from either end of said vehicle, said means comprising a longitudinally extending shaft, levers at both ends of said vehicle adapted to turn said longitudinal shaft and means connecting said longitudinal shaft with means on said transverse shaft to actuate said transverse shaft as said longitudinal shaft is turned.

11. A brake mechanism of the character described, comprising brakes at opposite sides of a vehicle, links connecting said brakes with arms mounted to turn with a shaft extending transversely of said vehicle, an arm extending at an angle to said first mentioned arms mounted to turn with said shaft, a second transverse shaft provided with an arm, said shafts being mounted at opposite ends of the vehicle, said transverse shafts being connected to simultaneously turn in opposite directions by means of a longitudinally extending shaft connected to said transverse shafts and means at the opposite ends of the vehicle for actuating said arms.

12. A brake mechanism of the character described, comprising brakes at opposite sides of a vehicle, links connecting said brakes with arms mounted to turn with a shaft extending transversely of said vehicle, an arm extending at an angle to said first mentioned arms mounted to turn with said shaft, a second transverse shaft provided with an arm, said shafts being mounted at opposite ends of the vehicle, said transverse shafts being connected to simultaneously turn in opposite directions by means of a longitudinally extending shaft connected to said transverse shafts and means at the opposite ends of the vehicle for actuating said arms.

13. A brake mechanism of the character described, comprising brakes at opposite sides of the vehicle, links connecting said brakes with arms mounted to turn with transverse shafts extending transversely of said vehicle at opposite ends thereof, arms extending at an angle to said first mentioned arms mounted to turn with said shaft, and means for actuating said last mentioned arms to operate said brakes from either end of said vehicle.

14. A brake mechanism of the character described, comprising brakes at opposite sides of the vehicle, links connecting said brakes with arms mounted to turn with transverse shafts extending transversely of said vehicle at opposite ends thereof, arms extending at an angle to said first mentioned arms mounted to turn with said shaft, and means for actuating said last mentioned arms to operate said brakes from either end of said vehicle, said means comprising operating levers at opposite ends of the vehicle, and lost motion connections between each of said last mentioned arms and each of said operating levers.

15. A brake mechanism for vehicles of the character described comprising a brake, a transverse shaft on the vehicle, arms extending at an angle to each other mounted on said shaft to turn therewith, one of said arms being operatively connected to said brake to operate the same, and means for actuating said other arm to operate said brake from either end of the vehicle.

16. A brake mechanism for vehicles of the character described comprising a brake, a transverse shaft on the vehicle, arms extending at an angle to each other mounted on said shaft to turn therewith, one of said arms being operatively connected to said brake to operate the same, and means for actuating said other arm to operate said brake from either end of the vehicle, said means comprising an operating lever at each end of said vehicle and a lost motion connection between said last mentioned arm and each of said operating levers.

In witness whereof, I hereunto subscribe my name this 21st day of August, A. D., 1920.

ALBERT P. LEE.